United States Patent [19]

Hallman

[11] 4,006,532
[45] Feb. 8, 1977

[54] GAUGE FOR MEASURING VEHICLE FRAME ALIGNMENT

[75] Inventor: Ellis A. Hallman, Lebanon, Oreg.
[73] Assignee: Kansas Jack, Inc., McPherson, Kans.
[22] Filed: Nov. 17, 1975
[21] Appl. No.: 632,562
[52] U.S. Cl. .................................. 33/288; 33/191; 33/193; 33/203.2
[51] Int. Cl.² ......................................... G01B 11/27
[58] Field of Search .............. 33/288, 193, 203.18, 33/203.2, 203.17, 203.21, 335, 191

[56] References Cited

UNITED STATES PATENTS

| | | | |
|---|---|---|---|
| 2,000,866 | 5/1935 | Smith | 33/288 |
| 2,481,420 | 9/1949 | Hanson | 33/288 |
| 2,581,021 | 1/1952 | Jacobson et al. | 33/288 |
| 3,162,950 | 12/1964 | Hykes | 33/193 X |
| 3,810,313 | 5/1974 | Hicks | 33/288 |

Primary Examiner—William D. Martin, Jr.
Attorney, Agent, or Firm—Fishburn, Gold & Litman

[57] ABSTRACT

A gauge for measuring alignment of a damaged vehicle frame during straightening thereof includes a body member having a sight member mounted thereon and first and second arms positioned in parallel alignment and extending in opposite directions from a center portion of the body member. The arms each have a respective hanger member extending upwardly therefrom and engageable with the vehicle frame to be straightened for supporting the arms and the body member thereon. The body member has a plurality of longitudinally spaced bearings and first and second guide members mounted thereon and in engagement with respective portions of the first and second arms whereby the gauge is adjustable and the first and second arms are maintained in substantially parallel alignment.

6 Claims, 5 Drawing Figures

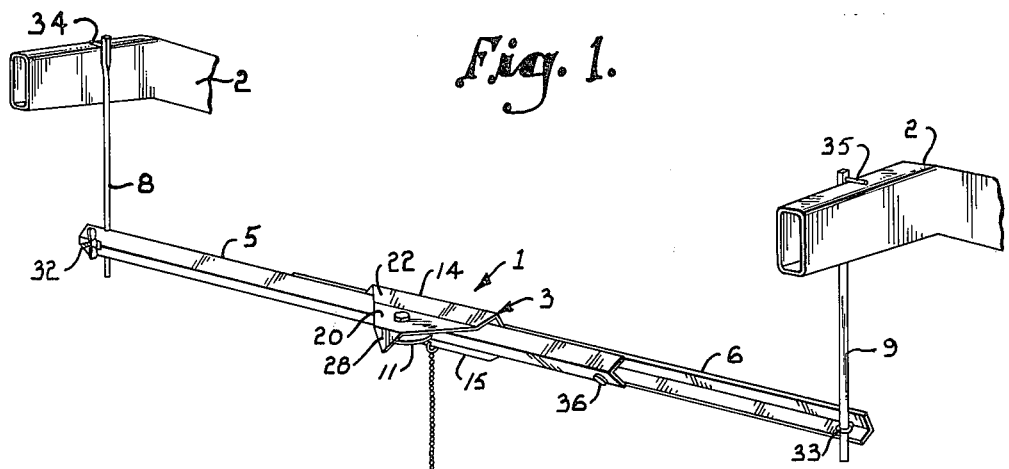

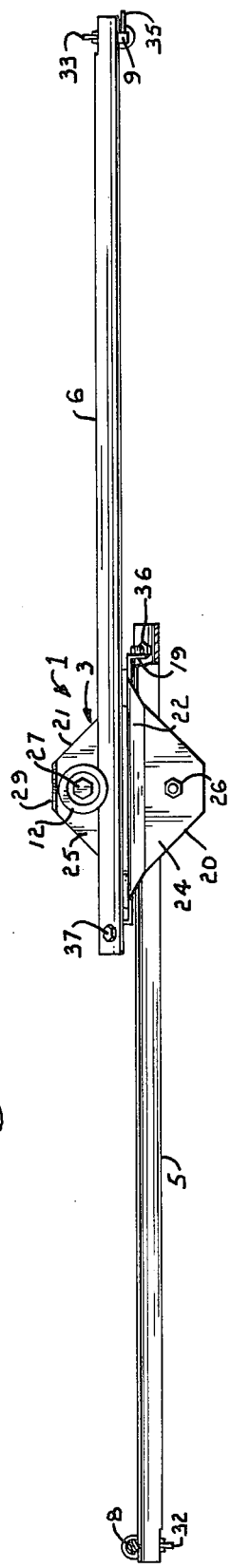
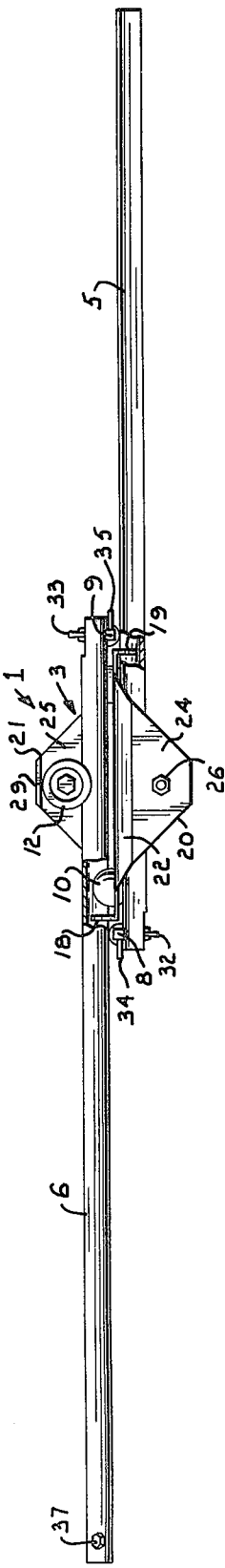

GAUGE FOR MEASURING VEHICLE FRAME ALIGNMENT

The present invention relates to means for checking vehicle frame alignment and more particularly to a gauge for measuring vehicle frame alignment during straightening of a damaged vehicle frame.

The principal objects of the present invention are: to provide a gauge for checking and measuring alignment of a damaged vehicle frame to be straightened; to provide such a gauge which is responsive to movement of portions of a vehicle frame during straightening thereof; to provide such a gauge having arms extending longitudinally in opposite directions from a body member and maintained in parallel alignment during movement of the vehicle frame; to provide such a gauge wherein the arms, body member and bearings or engaging portions provide for simultaneous and like movement of the arms relative to the body member in extension and contraction of the gauge; to provide such a gauge adapted to depend from a vehicle frame and thereby be visible by an operator during straightening of the vehicle frame; to provide such a gauge wherein a plurality of like gauges may be mounted on a vehicle frame to check the center line or longitudinal axis thereof, check the parallel alignment of frame members to detect twist, to establish a datum line and deviations of various frame members from the datum line, and check the frame for diamond alignment; to provide such a gauge having a plumb member depending from the body member thereof whereby the plumb member is visible below obstructions to view of the frame members; and to provide such a gauge which is economical to manufacture, durable in construction, trouble free in use, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the gauge for measuring vehicle frame alignment.

FIG. 1 is a perspective view of a gauge for measuring vehicle frame alignment and shown mounted on a damaged vehicle frame to be straightened.

FIG. 2 is an enlarged front elevational view of the gauge with portions of the frame shown in broken lines.

FIG. 3 is an enlarged and elevational view of the gauge with frame shown in broken lines.

FIG. 4 is an enlarged top plan view of the gauge with the arms extended to the maximum reach.

FIG. 5 is an enlarged top plan view of the gauge with the arms retracted to a minimum reach.

As required, detailed embodiments of the present invention are disclosed here, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 generally designates a gauge for checking or measuring alignment of a damaged vehicle frame 2 during straightening thereof. The gauge 1 includes a body member 3 having a sight member 4 thereon and first and second arms 5 and 6 positioned in parallel alignment and extending in opposite directions from a center portion 7 of the body member 3. The arms 5 and 6 have respective support members 8 and 9 engageable with the vehicle frame 2 for supporting the arms 5 and 6 and the body member 3 thereon. The body member 3 has a plurality of longitudinally spaced bearings 10 and first and second guide members 11 and 12 mounted thereon and in engagement with respective portions of the first and second arms 5 and 6 whereby the gauge 1 is longitudinally adjustable and the first and second arms 5 and 6 are maintained in substantially parallel alignment and having portions thereof positioned on the longitudinal axis of the gauge 1, and the arms move simultaneously relative to the body member. The structure is such that the guide members 11 and 12 provide opposing forces holding the arms against the bearing members to maintain the arms parallel.

In use, the body member 3 has the center portion or web 7 thereof positioned substantially vertically. The center portion 7 is a generally planar member and has opposed first and second or upper and lower side edge portions 14 and 15 and opposed first and second end edge portions 16 and 17. First and second abutment members 18 and 19 are mounted on the first and second end edge portions 16 and 17 respectively and extend substantially normal or perpendicular to the center portion 7 and in opposite direction therefrom.

The body member 3 includes first and second brackets 20 and 21 extending in opposite directions from the side edge portions 14 and 15 respectively of the center portion 7. The first and second guide members 11 and 12 are mounted on the first and second brackets 20 and 21 respectively. In the illustrated structure, the means of holding the guide members 11 and 12 under pressure against the arms 5 and 6 are by making each biased toward the center portion 7 of the body member 3. This holds the guide members 11 and 12 thereon in engagement with the first and second arms 5 and 6 respectively.

In the illustrated embodiment, the first and second brackets 20 and 21 have first portions 22 and 23 respectively adjacent the center portion 7 and are each positioned to define a respective acute angle between the center portion 7 and the respective first portion 22 and 23, said angles each preferably being 45° or less.

The first and second brackets have second portions 24 and 25 extending from the first portions 22 and 23 respectively thereof and are positioned substantially perpendicular to the center portion 7 of the body member 3. The first and second guide members 11 and 12 are mounted on the second portions 24 and 25 of the first and second brackets 20 and 21 respectively.

The first portions 22 and 23 of the first and second brackets 20 and 21 are each biased toward the center portion 7 of the body member 3 so that the first and second guide members 11 and 12 are each urged into firm engagement with the first and second arms 5 and 6 respectively and thereby hold same in engagement with the plurality of longitudinal spaced bearings 10.

The first and second guide members 11 and 12 are illustrated as pulley wheels rotatably mounted on suitable axles, such as bolts 26 and 27 respectively having suitable washers and nuts thereon for retaining the pulley wheels on the respective brackets. The pulley wheels are each illustrated as having a V-shaped peripheral surface adapted to receive an exterior surface of the respective arms 5 and 6 therein.

The illustrated first and second brackets 20 and 21 include guard portions 28 and 29 extending from the second portions 24 and 25 respectively and positioned substantially perpendicular thereto thereby at least partially enclosing the guide members 11 and 12 respectively.

The bearings 10 are mounted on the center portion 7 of the body member 3 and are longitudinally spaced along a longitudinal axis thereof. The bearings 10 are each rotatably mounted on the center portion 7 and engaged by the first and second arms 5 and 6. The bearings 10 are illustrated as balls mounted in corresponding apertures 30 in the web or center portion 7 of the body member 3. The bearings and the guide members 11 and 12 are in engagement with the arms 5 and 6 and co-operate therewith to maintain the arms 5 and 6 parallel.

The first and second arms 5 and 6 are positioned on opposite sides of the center portion 7 of the body member 3 and are positioned substantially parallel with and extending in opposite directions from the center portion 7. The first and second arms 5 and 6 are in facing relation and are each substantially parallel with the longitudinal axis of the center portion 7. The first and second arms 5 and 6 each have facing portions with angled faces in engagement with each of the bearings 10 providing a self aligning of each arm. In the illustrated structure, the arms are angle members with the legs thereof defining the angled face or V-shaped way. The corner of the angles defines respective ridges which are each received in a groove in the respective pulley wheels 11 and 12 thereby providing means on the body member 3 and in engagement with the first and second arms 5 and 6 for maintaining same in parallel alignment.

The gauge 1 has means on each of the arms 5 and 6 for engaging a vehicle frame 2 to be straightened and for supporting the arms 5 and 6 and the body member 3 thereon. In the illustrated embodiment, the arms 5 and 6 are elongated members having opposite end portions. One of the end portions of the first and second arms 5 and 6 have first and second support or hanger members 8 and 9 respectively mounted thereon and extending upwardly therefrom. The members 8 and 9 are illustrated as square bars and extend above and below the arms 5 and 6 respectively and are retained in engagement with an end of each of the legs of the angles, as by being received in suitable notches in the end edge of the legs and by fastening members 32 and 33 respectively. The illustrated fastening members 32 and 33 each have an eye or loop portion with the respective hanger member extending therethrough and a threaded shaft extending through the corner of the respective angles and having a suitable nut thereon for holding the respective hanger member in clamped engagement within the notch in the ends of each of the legs of the respective angles.

The first and second hanger members 8 and 9 have first and second support portions 34 and 35 respectively mounted thereon and extending outwardly therefrom. The support portions 34 and 35 are substantially perpendicular to the hanger members 8 and 9 and are each positioned adjacent an upper end portion of the respective hanger member. The support portions 34 and 35 are illustrated as pins and are each adapted to engage an upper surface of a respective frame member whereby the gauge 1 depends from the frame 2.

The other end portion of the arms 5 and 6 have stop members 36 and 37 respectively removably mounted thereon and engageable wth the abutment members 18 and 19 thereby retaining the arms 5 and 6 in engagement with the bearings 10.

The design and size of the hanger members 8 and 9, design of the fastening members 32 and 33, shape of the arms 5 and 6, size of the bearings 10, and position of the guide members 11 and 12 all co-operate to position the hanger members 8 and 9 coplanar with the longitudinal center line or axis of the center portion 7 of the body member 3.

The illustrated sight or plumb member 4 is mounted on and depends from the lower side edge portion of the center portion 7 of the body member 3 and is preferably positioned in the transverse center thereof whereby the plumb member 4 and the hanger members 8 and 9 are coplanar to permit sighting therealong to check the alignment of the vehicle frame 2.

The illustrated body member 3 is formed by bending a square plate so that the longitudinal axis of the body member 3 extends between one pair of opposed corners thereof. The other pair of opposed corners are bent to form the first and second brackets 11 and 12. The one pair of corners along the longitudinal axis of the body member 3 are bent in opposite directions to form the abutment members 18 and 19 respectively.

After the body member 3 has been formed the axles 26 and 27 are mounted thereon and the guide members 11 and 12 are mounted on the axles 26 and 27. The plumb member 4 is then suitably mounted on the lower side edge portion of the body member 3 and positioned to be coplanar with the center portion 7 when the gauge 1 is in use. The arms 5 and 6 are then mounted in engagement with the respective guide members 11 and 12 and the plurality of bearings 10. The stop members 36 and 37 are then mounted in the respective ends of the arms 5 and 6. The hanger members 8 and 9 are secured in the notches in the ends of the arms 5 and 6 respectively by the fastening members 32 and 33.

The support portions 34 and 35 are then positioned in engagement with an upper surface of respective portions of the vehicle frame 2 thereby supporting the gauge 1 below the vehicle frame 2.

It is to be understood that while I have ilustrated and described one form of my invention, it is not to be limited to the specific form or arrangement of parts herein described and shown.

What I claim and desire to secure by Letters Patent is:

1. A self-aligning extensible gauge for measuring vehicle frame alignment comprising:
   a. a body member having a longitudinally extending central portion and opposed laterally outwardly extending leg members thereon;
   b. a plurality of bearing members carried by and longitudinally spaced on said central portion;
   c. first and second elongate arms on opposite sides of said central portion and having inwardly facing surfaces movably engaging said bearing members, said arms extending longitudinally and having outer end portions in opposite directions from said body member, said arms each having outwardly facing surfaces;

d. guide members mounted on said leg members and having movable engagement with respective outer surfaces of said first and second arms and cooperating with said bearing members to maintain said arms movably mounted in parallel relationship, said leg members and guide members urging the respective arms laterally toward the bearing members;

e. means on outer end portions of each of the arms for engaging a vehicle frame to be straightened and supporting said arms and body member thereon; and f. a sight member mounted on said body member.

2. A gauge as set forth in claim 1 wherein:

a. said body member center portion having first and second side edge portions;

b. said body member legs are first and second brackets each extending outwardly from respective first and second side edge portions of said center portion;

c. said guide members are first and second rollers;

d. said first and second brackets extend in opposite directions from said center portion side edge portions and each have a respective one of said first and second guide rollers rotatably mounted thereon.

3. A gauge as set forth in claim 2 wherein:

a. the other end portion of each of said first and second arms has a stop member mounted thereon; and b. spaced abutment members are mounted on said center portion with each positioned to be engaged by said stop member of a respective one of said first and second arms to thereby retain same in engagement with said bearings and said respective first and second guide rollers.

4. A gauge as set forth in claim 2 wherein:

a. said plurality of bearings are each positioned on a longitudinal axis of said center portion;

b. said first and second brackets each have a first portion positioned to define an acute angle between said center portion and said respective first portion;

c. said first and second brackets each have a second portion extending from said respective first portion and positioned substantially normal to said center portion of said body member;

d. said first and second guide rollers are each mounted on said second portion of said respective first and second brackets; and e. said first portion of each of said first and second brackets are each biased toward said center portion of said body member so that said first and second guide rollers are each urged into engagement with said respective first and second arms thereby holding same in engagement with said bearings.

5. A gauge as set forth in claim 4 wherein:

a. each of said first and second arms have an inwardly facing way extending longitudinally thereof;

b. said inwardly facing ways are in facing relation and receive said bearings therein;

c. each of said first and second arms have an outwardly facing way ridge extending longitudinally thereof; and d. said first and second guide rollers have a groove in a peripheral surface thereof and each receiving therein the outwardly facing ridge of a respective one of said first and second arms.

6. A gauge as set forth in claim 5 wherein:

a. said body member center portion has bearing openings therein;

b. said bearing members are balls positioned in said bearing openings;

c. said first and second arms are angle members with legs thereof defining the inwardly facing ways which are V-shaped and said outwardly facing ridges; and d. said guide roller grooves are V-shaped and cooperate with the ways of the arms and bearing members in supporting and maintaining the first and second arms parallel.

* * * * *